(12) United States Patent
Shirai et al.

(10) Patent No.: US 6,221,505 B1
(45) Date of Patent: Apr. 24, 2001

(54) LAP JOINT WELDING ARRANGEMENT AND A RELATED WELDING METHOD FOR FORMING THE SAME

(75) Inventors: Hideaki Shirai, Okazaki; Yoshinori Ohmi, Kariya; Hiroyasu Morikawa, Aichi-ken, all of (JP)

(73) Assignee: Denso, Corporation, Kariya (JP)

( * ) Notice: Subject to any disclaimer, the term of this patent is extended or adjusted under 35 U.S.C. 154(b) by 0 days.

(21) Appl. No.: 09/154,588

(22) Filed: Sep. 17, 1998

(30) Foreign Application Priority Data

Oct. 3, 1997 (JP) .................................................. 9-287957
Feb. 27, 1998 (JP) ................................................. 10-064596

(51) Int. Cl.$^7$ ............................ B23K 26/04; B23K 26/00
(52) U.S. Cl. ..................... 428/594; 428/599; 428/679; 428/683; 428/685; 228/153; 228/154; 228/234.1
(58) Field of Search .................................. 428/594, 599, 428/614, 683, 685, 679; 228/153, 154, 234.1, 262.3

(56) References Cited

U.S. PATENT DOCUMENTS 4,078,919 * 3/1978 Kado et al. .
5,302,214 * 4/1994 Uematsu et al. .
5,603,853 * 2/1997 Mombo-Caristan .
5,628,449 * 5/1997 Onuma et al. .

FOREIGN PATENT DOCUMENTS 60-60175 4/1985 (JP) .
1-205892 8/1989 (JP) .
10-328861 * 12/1998 (JP) .

* cited by examiner

Primary Examiner—Deborah Jones
Assistant Examiner—Jason Savage
(74) Attorney, Agent, or Firm—Pillsbury Winthrop LLP

(57) ABSTRACT

A first member and a second member have end portions overlapped and welded by irradiating a laser beam on an outer surface of a lap portion. A front end surface of a fused portion slants at an obtuse angle larger than 90° with respect to a naked outer surface of the second member. A dilution rate $S=B/(A+B)$ is equal to or less than 45%, where "A" represents a cross-sectional area of the fused portion merging into the first member and "B" represents a cross-sectional area of the fused portion merging into the second member.

18 Claims, 11 Drawing Sheets

(B/(A+B): 10%)

(B/(A+B): 35%)

(B/(A+B)≧45%)

LAP JOINT WELDING ARRANGEMENT AND A RELATED WELDING METHOD FOR FORMING THE SAME

BACKGROUND OF THE INVENTION

The present invention relates to a lap joint welding arrangement and a related welding method.

For connecting two members, various joint arrangements have been conventionally proposed and used. Among them, a lap joint welding arrangement is widely known and used because of easiness in positioning the two members to be welded before performing the welding operation.

In this kind of lap joint welding structure, there is a possibility that a particular portion may be subjected to a concentrated stress, causing a crack in the welded portion.

SUMMARY OF THE INVENTION

An object of the present invention is to provide a lap joint welding structure and a related welding method capable of effectively moderating or relieving a stress acting on a fused portion and preventing the fused portion from causing cracks.

In order to accomplish this and other related objects, an aspect of the present invention provides a lap joint welding structure comprising a first member and a second member having end portions overlapped and fixed by welding at a predetermined lap portion. A fused edge portion is formed at the lap portion as a fused and hardened portion merging into the first member and the second member. A front end surface of the fused edge portion slanting at an obtuse angle larger than 90° with respect to a naked outer surface of the second member not overlapped with the first member.

Preferably, second member has a rod body inserted into a bore of the first member. The first member has a rib brought into contact with the second member.

Preferably, the first member is a Ni-group alloy steel comprising the components (weight %) of C ($\leq 0.05$), Si ($\leq 0.30$), Mn ($\leq 1.25$), P ($\leq 0.04$), S ($\leq 0.03$), and Ni (40.00~50.00). The second member is a martensite-group stainless steel comprising the components (weight %) of C ($\leq 1.20$), Si ($\leq 1.00$), Mn ($\leq 1.25$), P ($\leq 0.04$), S ($\leq 0.03$), and Cr ($\leq 18.00$). A dilution rate S=B/(A+B) is equal to or less than 45%, where "A" represents a cross-sectional area of the fused edge portion merging into the first member and "B" represents a cross-sectional area of the fused edge portion merging into the second member.

Alternatively, the first member is a ferrite-group stainless steel comprising the components (weight %) of C ($\leq 0.12$), Si ($\leq 3.00$), Mn ($\leq 1.25$), P ($\leq 0.04$), S ($\leq 0.03$), Cr ($\leq 20.00$), and Al ($\leq 5.00$). In this case, the dilution rate S=B/(A+B) is equal to or less than 30%.

The fused edge portion is formed at the lap portion by irradiating a welding beam on an outer surface of the lap portion.

Another aspect of the present invention provides a welding method of forming the lap joint welding structure for connecting the first member and the second member. In a first step, the lap portion is formed by overlapping the end portions of the first member and the second member. In a second step, the welding beam is irradiated to a predetermined irradiation point on the outer surface of the lap portion offset from an end surface thereof. In a third step, the fused edge portion is formed along an outer periphery of the lap portion as the fused and hardened portion merging into the first member and the second member.

Preferably, the rod body of the second member is inserted into the bore of the first member for forming the lap portion. A distal end surface of the second member is brought into contact with the rib formed in the bore of the first member.

Preferably, the irradiation of the welding beam is performed along an entire periphery of the lap portion so that the front end surface of the fused edge portion slants at the obtuse angle larger than 90° with respect to the naked outer surface of the second member not overlapped with the first member.

Another aspect of the present invention provides a welding method of forming a lap joint welding structure for connecting first member and second members configured into the shapes different from those of the above-described members. The first member has a head portion, a stem portion, and a hole extending in the head portion and the stem portion. In a first step, a lap portion is formed by inserting the second member into the hole of the first member to form a lap portion. A welding beam is irradiated to a predetermined irradiation point on an outer surface of the stem member of the lap portion. A fused portion is formed along a periphery of the lap portion as a fused and hardened portion merging into the first member and the second member.

Preferably, the first member is made of a magnetic material comprising at least one selected from the group consisting of a silicon steel, a Ni-group alloy steel, and a ferrite stainless steel. The second member is made of an anti-wear metallic material comprising at least one selected from the group consisting of an alloy tool steel, a high speed tool steel, and a martensite-group stainless steel. The dilution rate S=B/(A+B) is in a range from 15 to 45%.

Another aspect of the present invention provides a lap joint welding structure comprising the first member having the head portion, the stem portion, and the hole extending in the head portion and the stem portion. The lap portion is formed between the first member and the second member inserted into the hole of the first member. The fused portion is formed along a periphery of the lap portion as the fused and hardened portion merging into the first member and the second member.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
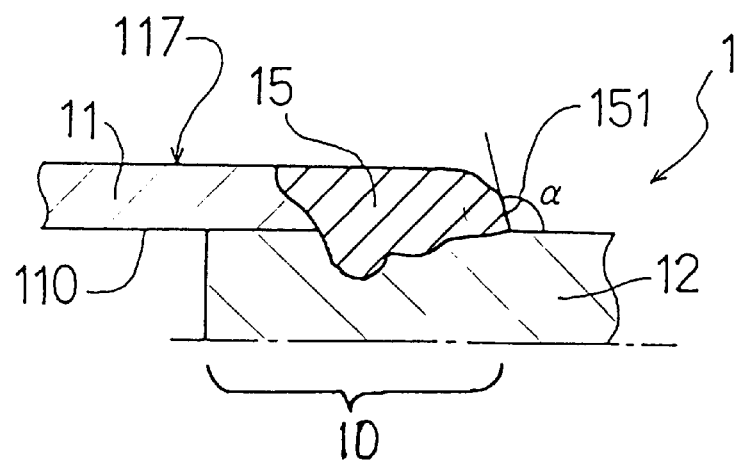
FIG. 1 is a cross-sectional view showing a lap joint welding arrangement in accordance with a first embodiment of the present invention.

Preferred embodiments of the present invention will be explained hereinafter with reference to attached drawings. Identical parts are denoted by the same reference numerals throughout the views.

First Embodiment

FIGS. 1 to 5 show a lap joint welding arrangement and a related welding method in accordance with a first embodiment of the present invention.

A lap joint welding arrangement 1 of the first embodiment comprises a first member 11 and a second member 12. The first member 11 and the second member 12 have respective end portions overlapped and fixed by welding at a predetermined lap portion 10.

Irradiating a welding beam 8 to an outer surface 117 of the first member 11 makes the first member 11 and the second member 12 fuse together. Cooling down the welded portion leaves a hardened fused edge portion 15. The fused edge portion 15 merges into the overlapped regions of the first member 11 and the second member 12. A front end surface 151 of the fused edge portion 15 slants at an obtuse angle $\alpha$ larger than 90° with respect to a naked outer surface of the second member 12 not overlapped with the first member 11.

Figure 2:
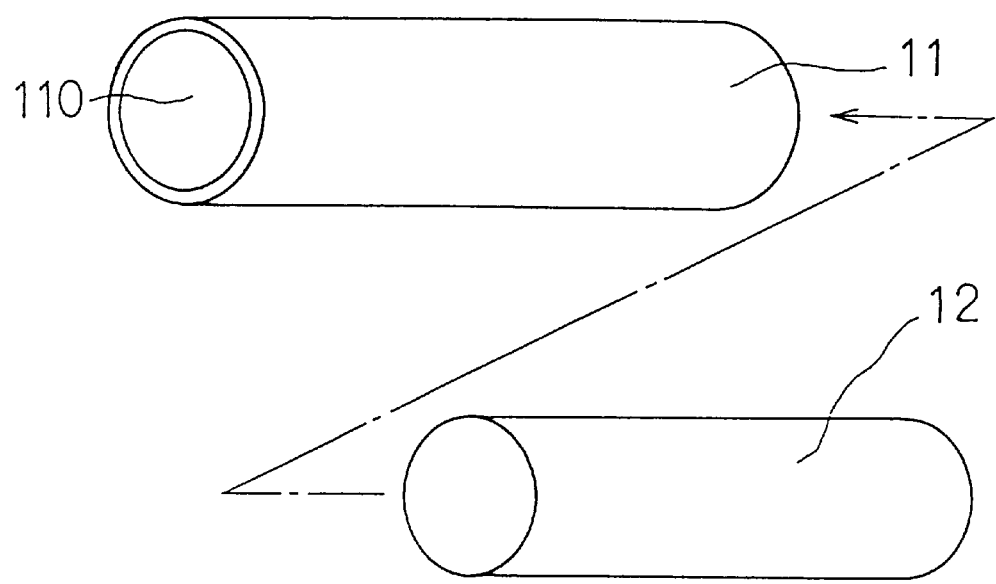
FIG. 2 is a perspective view illustrating first and second members in accordance with the first embodiment of the present invention.

As shown in FIG. 2, the first member 11 is a round pipe having a cylindrical bore (i.e., cylindrical hollow space) 110 and made of a Ni-group alloy steel. The second member 12 is a round solid bar made of a martensite-group stainless steel. An inner diameter of the first member 11 is substantially equal to an outer diameter of the second member 12.

Tables 1 and 2 show chemical components (weight %) contained in the first member 11 (Ni-group alloy steel) and the second member 12 (martensite-group stainless steel), respectively.

TABLE 1

| C | Si | Mn | P | S | Ni | Fe |
|---|---|---|---|---|---|---|
| ≦0.05 | ≦0.30 | ≦1.25 | ≦0.04 | ≦0.03 | 40.00~50.00 | Bal. |

TABLE 2

| C | Si | Mn | P | S | Cr | Fe |
|---|---|---|---|---|---|---|
| ≦1.20 | ≦1.00 | ≦1.25 | ≦0.04 | ≦0.03 | ≦18.00 | Bal. |

Figure 3:
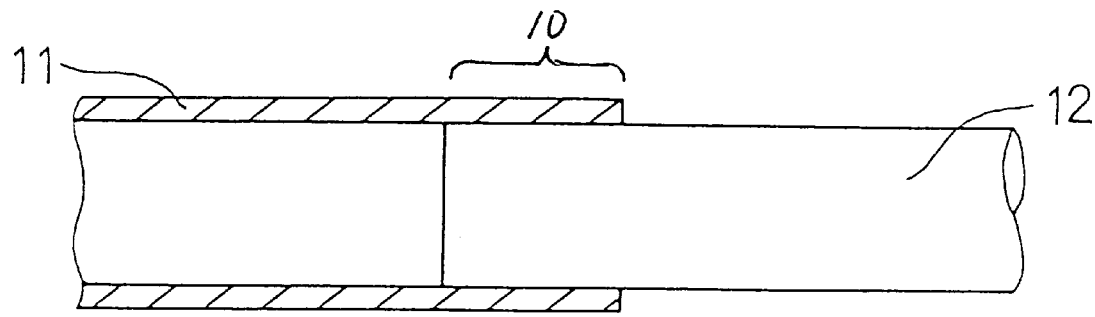
FIG. 3 is a cross-sectional view showing the first and second members coupled in accordance with the first embodiment of the present invention.

In welding the first member 11 with the second member 12, the round rod body of the second member 12 is press fitted into the cylindrical bore 110 of the first member 11. FIG. 3 shows the lap portion 10 formed by coupling the second member 12 into the first member 11.

Figure 4:
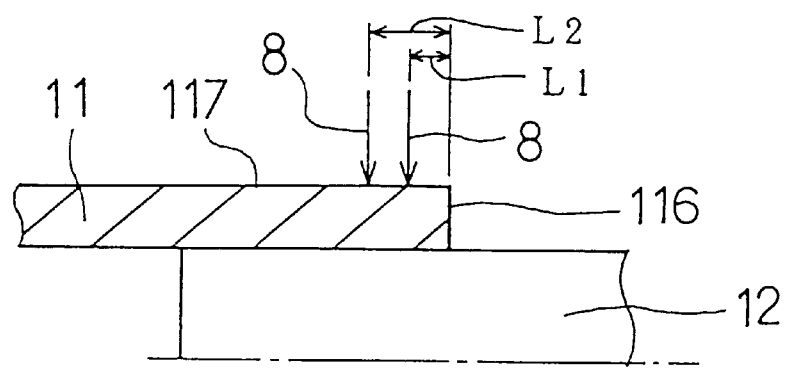
FIG. 4 is an enlarged cross-sectional view explaining irradiation points of a laser beam in accordance with the first embodiment of the present invention.

FIG. 4 shows the laser beam 8, such as a YAG laser causing sufficient welding energy, irradiated on the outer cylindrical surface 117 of the first member 11. A front end surface 116 of the first member 11, normal to the outer surface of the second member 12, is not directly subjected to the laser beam 8.

As shown in FIG. 4, the laser beam 8 is directed to a selected irradiation point offset from the front end surface 116 by a distance L1. Another irradiation point for the laser beam 8 is set at a distance L2 offset from the front end surface 116. For obtaining a satisfactory strength at the fused edge portion 15, a preferable value for the distance L1 is 0.35mm±0.05mm, while a preferable value for the distance L2 is and 0.85mm±0.1 mm.

The pulse irradiation of the laser beam 8 is applied along an entire cylindrical periphery of the first member 11 while maintaining the above-described offset distance from the end surface 116. As a result, the fused edge portion 15 is formed at the edge of the first member 11 as shown in FIG. 1. This welding method is generally referred to as a spot welding. However, it is possible to replace the spot welding by a seam welding. The seam welding is realized by continuously applying the laser beam 8 in the same manner.

The fused edge portion 15, thus formed by the irradiation of the laser beam 8, has the front end surface 151 slanting with the obtuse angle $\alpha$ larger than 90° with respect to the naked outer surface of the second member 12.

Figure 5:
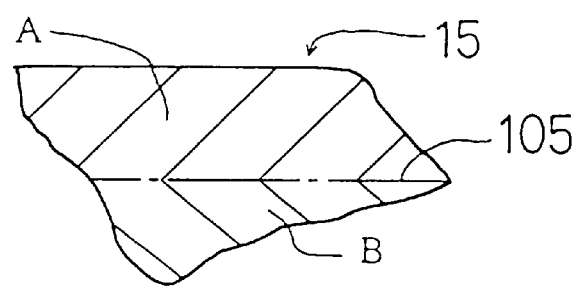
FIG. 5 is an enlarged cross-sectional view explaining a dilution rate of a fused edge portion in accordance with the first embodiment of the present invention.

For example, a preferable dilution rate "S" of the resultant fused edge portion 15 is 35%. An allowable value of the dilution rate "S" is equal to or less than 45%. In this case, the dilution rate "S" is expressed by the following equation.

$$S = B/(A+B) \times 100(\%) \quad (1)$$

where "A" and "B" represent cross-sectional areas of the fused edge portion 15 merging into the first member 11 and the second member 12, respectively. FIG. 5 is a cross-sectional view showing the areas "A" and "B" of the fused edge portion 15 divided by a border line 105 between the overlapped first and second members 11 and 12.

According to the above-described lap joint welding arrangement of the first embodiment, the outer surface of the first member 11 is smoothly curved and connected to the outer surface of the second member 12 by the provision of the fused end portion 15 that has the front end surface 151 slanting with the obtuse angle α larger than 90° with respect to the naked outer surface of the second member 12 as shown in FIG. 1.

The lap joint welding arrangement of the first embodiment causes no crack or cutout at the front edge of the fused edge portion 15. Accordingly, it becomes possible to prevent the front end surface of the first member 11 in the lap portion 10 from being subjected to a concentrated stress.

Furthermore, the fused edge portion 15 having the dilution rate "S"=35% provides relatively high toughness capable of suppressing any troubles which were derived from the cracks appearing in the welded portions in the conventional welding arrangements.

Furthermore, press fitting the round rod body of the second member 12 into the cylindrical bore of the first member 11 is effective to prevent a particular portion from being subjected to a concentrated stress. This provides a welding structure excellent in fatigue strength.

Second Embodiment

Figure 6A:
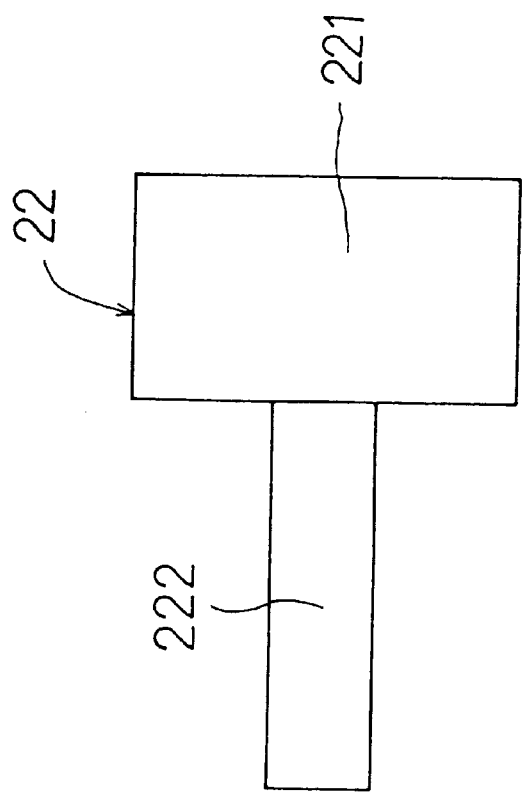
FIG. 6A is a cross-sectional view showing a first member in accordance with a second embodiment of the present invention.
Figure 6B:
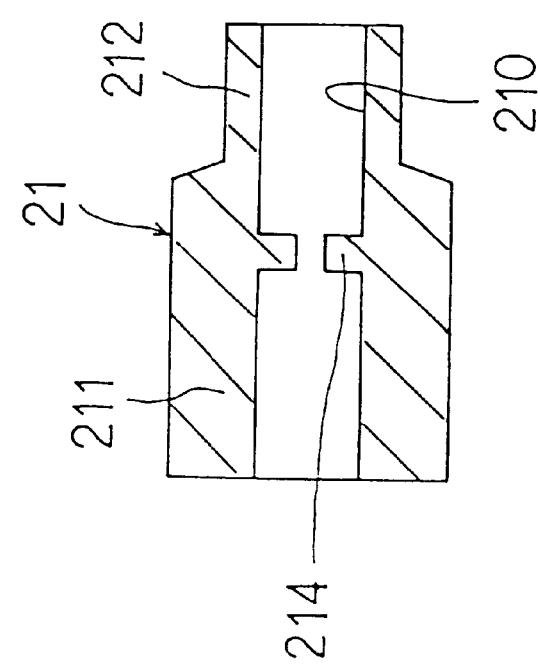
FIG. 6B is a front view showing a second member in accordance with the second embodiment of the present invention.
Figure 7:
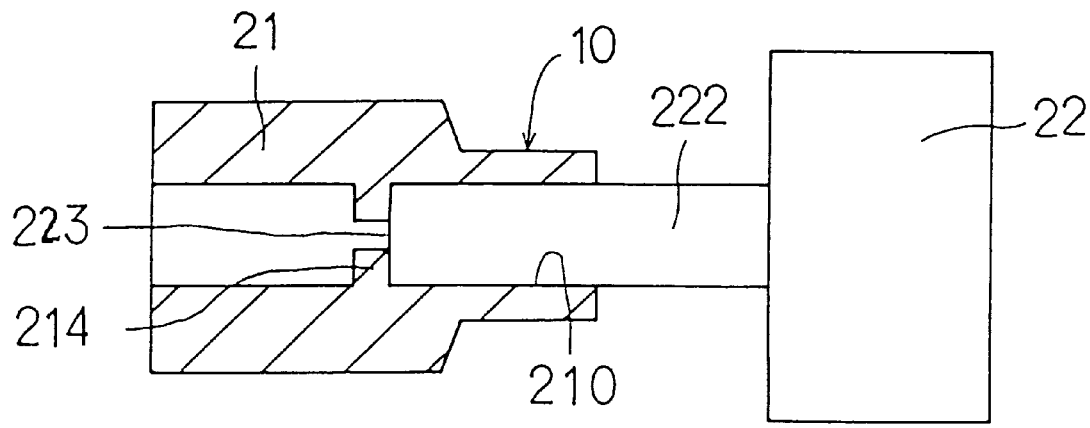
FIG. 7 is a cross-sectional view showing the first and second members coupled in accordance with the second embodiment of the present invention.
Figure 8:
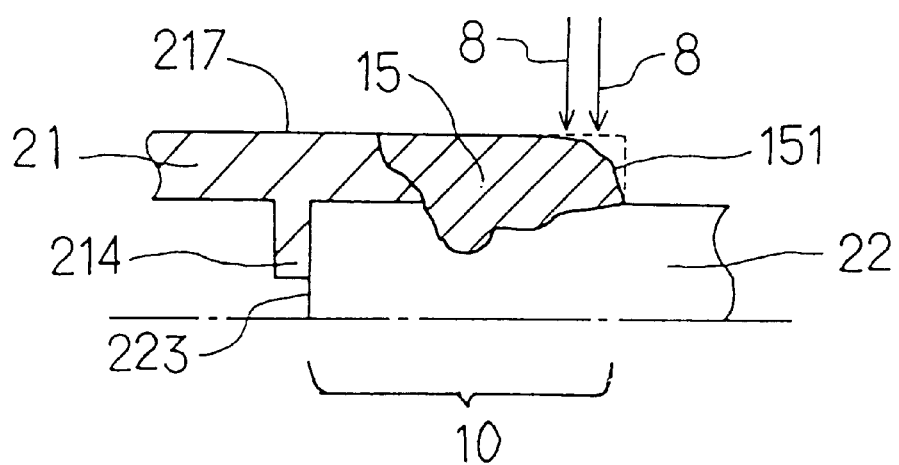
FIG. 8 is a cross-sectional view showing a lap joint welding arrangement in accordance with the second embodiment of the present invention.

FIGS. 6 to 8 show a lap joint welding arrangement and a related welding method in accordance with a second embodiment of the present invention.

A first member 21, as shown in FIG. 6A, has a larger-diameter portion 211 and a smaller-diameter portion 212. Furthermore, the first member 21 has an axially extending cylindrical bore (i.e., through hole) 210. A ring rib 214 protrudes in the radially inward direction from the inner cylindrical wall of the cylindrical bore 210.

A second member 22, as shown in FIG. 6B, has a solid larger-diameter portion 221 and a smaller-diameter portion 222. An outer diameter of the smaller-diameter portion 222 is substantially equal to an inner diameter of the inner diameter of the cylindrical bore 210 of the first member 21. The smaller-diameter portion 222 is press fitted into the cylindrical bore 210 of the first member 21.

In welding the first member 21 with the second member 22, the smaller-diameter portion 222 is press fitted into the cylindrical bore 210 of the first member 21. A distal end surface 223 of the smaller-diameter portion 222 is brought into contact with the ring rib 214. FIG. 7 shows the lap portion 10 formed by the coupling of the second member 22 into the first member 21.

FIG. 8 shows the fused edge portion 15 formed by irradiating the laser beam 8 on an outer cylindrical surface 217 of the first member 21 in the same manner as in the first embodiment.

According to the second embodiment, the second member 22 is brought into contact with the ring rib 214. This arrangement is effective to moderate or relieve a stress acting in a compression direction between the first member 21 and the second member 22.

Possible Modification

Instead of using the Ni-group alloy steel shown in the table 1, the first member 11 or 21 can be made of a ferrite-group stainless steel. In this case, a preferable dilution rate "S" is less than 30%. Table 3 shows chemical components (weight %) of the ferrite-group stainless steel.

TABLE 3

| C | Si | Mn | P | S | Cr | Al | Fe |
|---|----|----|---|---|----|----|-----|
| ≦0.12 | ≦3.00 | ≦1.25 | ≦0.04 | ≦0.03 | ≦20.00 | ≦5.00 | Bal. |

The shapes of the first and second members are not limited to the round or cylindrical bodies, and therefore can be configured into various shapes, such as rectangular bodies.

Characteristic Features Of 1st and 2nd Embodiments

As apparent from the foregoing description, the above-described first and second embodiments of the present invention provide the lap joint welding structure comprising the first member (11; 21) and the second member (12; 22) having end portions overlapped and fixed by welding at the predetermined lap portion (10). The fused edge portion (15) is formed at the lap portion (10) as a fused and hardened portion merging into the first member (11; 21) and the second member (12; 22). The front end surface (151) of the fused edge portion (15) slants at the obtuse angle (α) larger than 90° with respect to the naked outer surface of the second member (12; 22) not overlapped with the first member (11; 21).

According to this arrangement, it is possible to form the fused edge portion (15) different from the conventional fillet provided at right angles along the boundary between the first member and the second member (refer to Published Japanese Patent Application No. Kokai 60-60175), and also different from the conventional welding structure using a so-called welding rod or electrode. The fused edge portion (15) of the present invention provides an enhanced welding strength and a smoothly curved connecting portion between the first member and the second member. The obtuse slant angle (α) of the front end surface (151) of the fused edge portion (15) is effective to prevent a particular portion from being subjected to a concentrated stress.

The second member (12; 22) has the rod body inserted into the bore (110; 210) of the first member (11; 21). The first member (21) has the rib (214) brought into contact with the second member (22). Providing the rib (214) is effective to moderate or relieve a stress acting in the compression direction between the first member (21) and the second member (22).

Press fitting the round rod body of the second member 12 into the cylindrical bore of the first member 11 is effective to prevent a particular portion from being subjected to a concentrated stress. This provides a welding structure excellent in fatigue strength.

The first member is a Ni-group alloy steel comprising the components (weight %) of C (≦0.05), Si (≦0.30), Mn (≦1.25), P (≦0.04), S (≦0.03), Ni (40.00~50.00), and Fe (Balance). The second member is a martensite-group stainless steel comprising the components (weight %) of C ($\leqq 1.20$), Si ($\leqq 1.00$), Mn ($\leqq 1.25$), P ($\leqq 0.04$), S ($\leqq 0.03$), Cr ($\leqq 18.00$), and Fe (balance). The dilution rate S=B/(A+B) is equal to or less than 45%, where "A" represents the cross-sectional area of the fused edge portion (15) merging into the first member (11; 21) and "B" represents the cross-sectional area of the fused edge portion (15) merging into the second member (12; 22).

Alternatively, the first member is a ferrite-group stainless steel comprising the components (weight %) of C ($\leqq 0.12$), Si ($\leqq 3.00$), Mn ($\leqq 1.25$), P ($\leqq 0.04$), S ($\leqq 0.03$), Cr ($\leqq 20.00$), Al ($\leqq 5.00$), and Fe (balance). The second member is the martensite-group stainless steel comprising the components (weight %) of C ($\leqq 1.20$), Si ($\leqq 1.00$), Mn ($\leqq 1.25$), P ($\leqq 0.04$), S ($\leqq 0.03$), Cr ($\leqq 18.00$), and Fe (balance). In this case, the dilution rate S=B/(A+B) is equal to or less than 30%.

By using the above-described steels for the first and second members, it becomes possible to provide enhance robustness against fatigue.

The limitations of respective chemical components involved in the first and second members are determined by the following reasons.

<1>Ni-group alloy steel for the first member:

C ($\leqq 0.05$)—The component "C" is added to maintain a sufficient material strength. If the weight percentage of "C" exceeds 0.05%, the magnetic characteristics will be deteriorated.

Si ($\leqq 0.30$)—The component "Si" is added as a deoxidizer as well as an enhancing element. If the weight percentage of "Si" exceeds 0.30%, the material will become fragile.

Mn ($\leqq 1.25$)—The component "Mn" is added as a deoxidizing element used in the manufacturing of the steel. If the weight percentage of "Mn" exceeds 1.25%, the processibility will be deteriorated.

P ($\leqq 0.04$)—The component "P" is added to enhance the crack sensitivity. If the weight percentage of "P" exceeds 0.04%, the weldability will be deteriorated.

S ($\leqq 0.03$)—The component "S" is added to reduce the viscosity of the fused metal and enhance the crack sensitivity. If the weight percentage of "S" exceeds 0.03%, the weldability will be deteriorated.

Ni (40.00~50.00)—The component "Ni" is added to main component necessary for improving the corrosive resistance and the magnetic characteristics. If the weight percentage of "Ni" is less than 40.00% or greater than 50.00%, both the corrosive resistance and the magnetic characteristics will be deteriorated.

$\leqq 2$>Martensite-group stainless steel for the first member:

C ($\leqq 1.20\%$)—The component "C" is added to maintain sufficient material strength and hardness. If the weight percentage of "C" exceeds 1.20%, both the weldability and the corrosive resistance will be deteriorated.

Si ($\leqq 1.00$)—The component "Si" is added as a deoxidizer as well as an enhancing element. If the weight percentage of "Si" exceeds 1.00%, the material will become fragile.

Mn ($\leqq 1.25$)—The component "Mn" is added as a deoxidizing element used in the manufacturing of the steel. If the weight percentage of "Mn" exceeds 1.25%, the processibility will be deteriorated.

P ($\leqq 0.04$)—The component "P" is added to enhance the crack sensitivity. If the weight percentage of "P" exceeds 0.04%, the weldability will be deteriorated.

S ($\leqq 0.03$)—The component "S" is added to reduce the viscosity of the fused metal and enhance the crack sensitivity. If the weight percentage of "S" exceeds 0.03%, the weldability will be deteriorated.

Cr ($\leqq 18.00$)—The component "Cr" is added to giving the corrosive resistance. If the weight percentage of "Cr" exceeds 18.00%, the material will become fragile.

$\leqq 3$>Ferrite-group stainless steel for the first member:

C: ($\leqq 0.12$)—The component "C" is added to maintain a sufficient material strength. If the weight percentage of "C" exceeds 0.12%, both the processibility and the magnetic characteristics will be deteriorated.

Si ($\leqq 3.00$)—The component "Si" is added to improve the magnetic permeability. If the weight percentage of "Si" exceeds 3.00%, the material will become fragile.

Mn ($\leqq 1.25$)—The component "Mn" is added as a deoxidizing element used in the manufacturing of the steel. If the weight percentage of "Mn" exceeds 1.25%, the processibility will be deteriorated.

P ($\leqq 0.04$)—The component "P" is added to enhance the crack sensitivity. If the weight percentage of "P" exceeds 0.04%, the weldability will be deteriorated.

S ($\leqq 0.03$)—The component "S" is added to reduce the viscosity of the fused metal and enhance the crack sensitivity. If the weight percentage of "S" exceeds 0.03%, the weldability will be deteriorated.

Cr ($\leqq 20.00$)—The component "Cr" is added to giving the corrosive resistance. If the weight percentage of "Cr" exceeds 20.00%, the material will become fragile and the cold processibility will be deteriorated. Furthermore, the cost will be increased.

Al ($\leqq 5.00$)—The component "Al" is added to increase the magnetic specific resistance. If the weight percentage of "Al" exceeds 5.00%, the processibility will be deteriorated.

Regarding the limitation of the dilution rate "S," the fused edge portion becomes fragile when "S" exceeds the above-described value in each case.

The fused edge portion (15) is formed at the lap portion (10) by irradiating a welding beam (8), such as laser beam, electron beam and arc beam, on the outer surface (117, 217) of the lap portion (10). Using this kind of welding beam is easy to control the irradiation position on the outer surface of the lap region.

Furthermore, the first and second embodiments of the present invention provide the welding method for forming the lap joint welding structure. The welding method comprising the following steps. In a first step, the lap portion (10) is formed by overlapping the end portions of the first member (11; 21) and the second member (12; 22). In a second step, the welding beam (8) is irradiated to the predetermined irradiation point on the outer surface (117, 217) of the lap portion (10) offset from the end surface (116). In a third step, the fused edge portion (15) is formed at the lap portion (10) as the fused and hardened portion merging into the first member (11; 21) and the second member (12; 22).

For forming the lap portion (10), the rod body of the second member (12; 22) is inserted into the bore (110; 210) of the first member (11; 21) by press fitting. The distal end surface (223) of the second member (22) is brought into contact with the rib (214) formed in the bore (210) of the first member (21).

The irradiation of the welding beam (8) is performed along the entire cylindrical periphery of the lap portion (10) so that the front end surface (151) of the fused edge portion (15) slants at the obtuse angle ($\alpha$) larger than 90° with respect to the naked outer surface of the second member (12; 22) not overlapped with the first member (11; 21).

Third Embodiment

FIGS. 9A, 9B and 10~12 show a lap joint welding arrangement and a related welding method in accordance with a third embodiment of the present invention.

A lap joint arrangement 308 of the third embodiment, as shown in FIGS. 9A, 9B and 10–11, comprises a first member 302 and a second member 303. The first member 302 has a cylindrical body comprising a head portion 321 and a stem portion 322 integrally formed each other. A cylindrical through hole 323 extends entirely in an axial direction of the first member 302. The second member 303 has a pipe body having a through hole 230. An outer diameter of the second member 303 is substantially identical with an inner diameter of the through hole 323 of the first member 302. The second member 303 is press fitted into the through hole 323 of the first member 302 to form a lap portion 310 where the first member 302 and the second member 303 are overlapped.

Figure 9A:
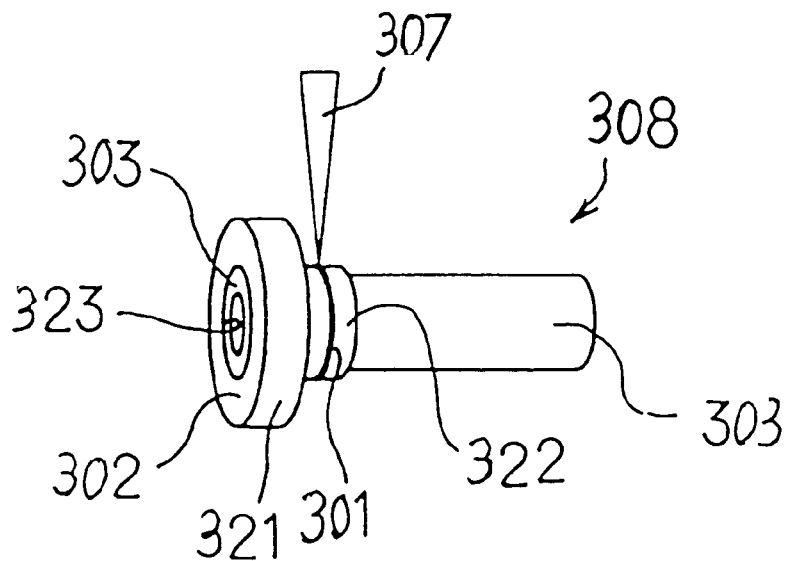
FIG. 9A is a perspective view showing a lap joint welding arrangement in accordance with a third embodiment of the present invention.
Figure 10:
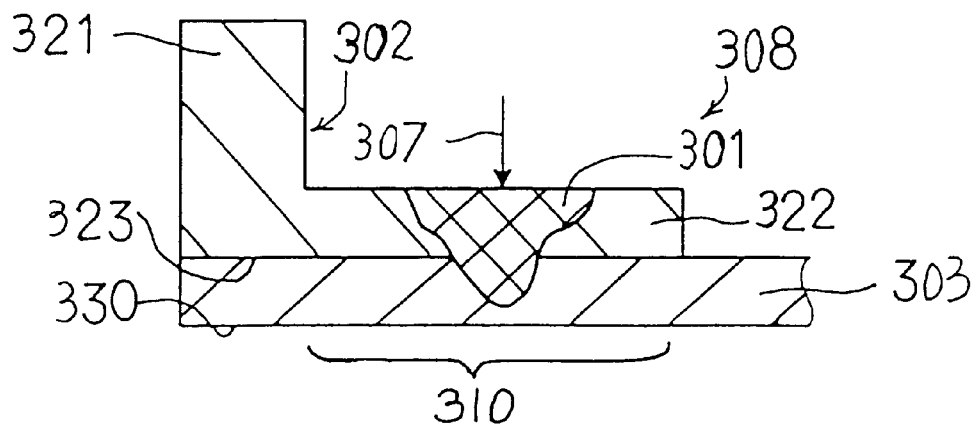
FIG. 10 is a cross-sectional view showing an essential part of the lap joint welding arrangement in accordance with the third embodiment of the present invention.
Figure 11:
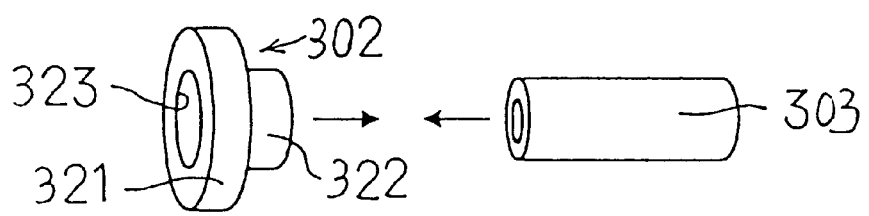
FIG. 11 is a view illustrating a coupling of two members to be welded in accordance with the third embodiment of the present invention.
Figure 12:
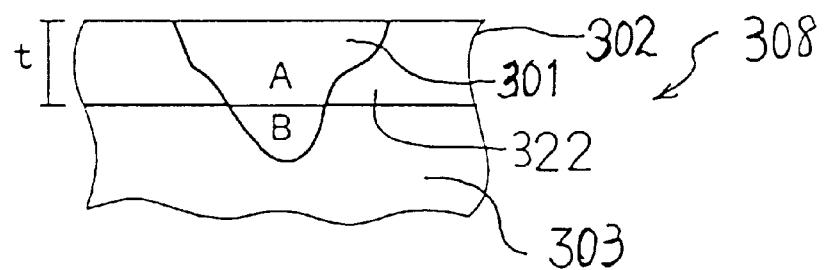
FIG. 12 is a cross-section view illustrating a dilution rate "S" of a fused portion merging into the two welded members in accordance with the third embodiment of the present invention.

As shown in FIG. 9A, irradiation of a laser beam 307 of 380 W is performed at a speed of 25 mm/sec along an entire cylindrical periphery of the lap portion 310, i.e., along an outer surface of the stem portion 322 of the first member 302. This makes the first member 302 and the second member 303 fuse together. Cooling down the welded portion leaves a hardened fused portion 301. The fused portion 301 merges into the overlapped regions of the first member 302 and the second member 303, as shown in FIGS. 10 and 12.

The first member 302 is made of a magnetic material, such as a silicon steel, a Ni-group alloy steel, and a ferrite stainless steel.

Table 4 shows chemical components (weight %) of a preferable silicon steel for the first member 302.

TABLE 4

| C | Si | Mn | P | S | Pb | Fe |
|---|----|----|---|---|----|----|
| ≦0.02 | ≦3.00 | ≦0.30 | ≦0.02 | ≦0.02 | ≦0.25 | Bal. |

Tables 1 and 3, explained in the above-described first and second embodiments, show the chemical components of the preferable Ni-group alloy steel and the ferrite stainless steel for the first member 302, respectively.

The second member 303 is made of an anti-wear metallic material, such as an alloy tool steel, a high speed tool steel, and a martensite-group stainless steel.

Table 5 shows chemical components (weight %) of a preferable alloy tool steel for the second member 303.

TABLE 5

| C | Si | Mn | P | S | V | Cr | MO | Fe |
|---|----|----|---|---|---|----|----|-----|
| ≦2.4 | ≦1.2 | ≦0.6 | ≦0.03 | ≦0.03 | ≦2.2 | ≦15.0 | ≦3.0 | Bal. |

Table 6 shows chemical components (weight %) of a preferable high speed tool steel for the second member 303.

TABLE 6

| C | Si | Mn | P | S | Cr | W | V | Fe |
|---|----|----|---|---|----|---|---|-----|
| ≦1.6 | ≦0.5 | ≦0.4 | ≦0.03 | ≦0.03 | ≦4.5 | ≦19.0 | ≦5.2 | Bal. |

Table 2, explained in the above-described first embodiment, shows the chemical components of the preferable martensite-group stainless steel for the second member 303.

A dilution rate "S" of the fused portion 301 is in a range from 15% to 45%. For example, the dilution rate "S" is set to 35% when the first member 302 is made of the silicon steel of Table 4 and the second member 303 is made of the alloy tool steel of Table 5.

Regarding detailed dimensions of the first member 302, the head portion 321 has a diameter of 22 mm and an axial length of 6.7 mm. The stem portion 322 is 8 mm in the outer diameter, 0.6 mm in the thickness "t", and 3 mm in the axial length. The second member 303 is 6.5 mm in the diameter, 3 mm in the thickness, and 20 mm in the axial length.

The lap joint welding arrangement of the third embodiment is preferably used for an operation valve incorporated in a fuel injector of an internal combustion engine. This kind of operation valve is electromagnetically ON-and-OFF controlled.

Next, functions and effects of the third embodiment will be explained hereinafter.

First, the second member 303 is inserted into the through hole 323 of the first member 302. Then, irradiation of the laser beam 307 is performed along an entire cylindrical periphery of the outer surface of the stem portion 322. The first member 302 and the second member 303 fuse together through this laser welding. Then, the laser welded portion is cooled down to harden, leaving the fused portion 301 merging into the overlapped regions of the first member 302 and the second member 303. During the cooling-down operation, the second member 302 is subjected to a compression force acting in a radial direction toward the center thereof. The pipe body of the second member 303 absorbs this compression force. The grain boundary of the obtained metal crystals is strong. There is no deposition of impurity elements. The fused portion 301 is free from cracks.

Furthermore, as the pipe body of the second member 303 is made of the anti-wear metallic material, the lap joint welding arrangement 308 of the third embodiment provides an excellent durability against wear and abrasion when employed in the fuel injector.

Comparative Example 1

Figure 13:
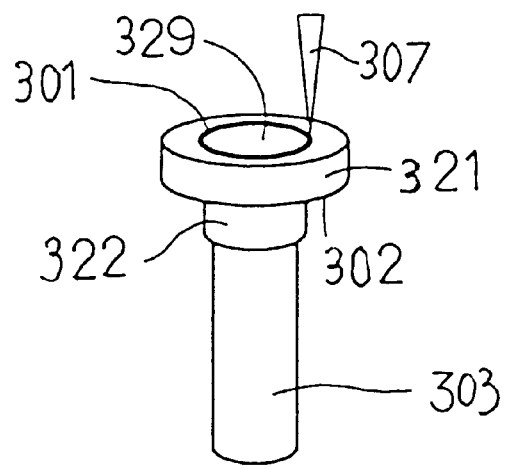
FIG. 13 is a perspective view showing a welding arrangement in accordance with a comparative example.
Figure 14:
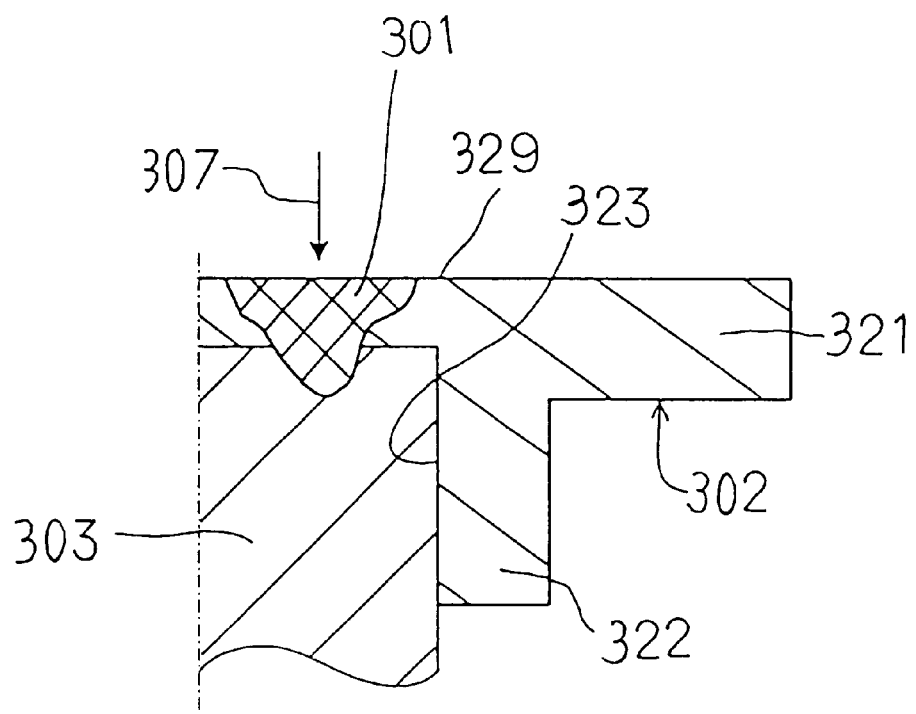
FIG. 14 is an enlarged cross-sectional view showing an essential part of the welding arrangement shown in FIG. 13.

FIGS. 13 and 14 show a comparative welding arrangement. The irradiation of the laser beam 307 is applied along a circle having a predetermined diameter on a circular flat portion 329 of the head portion 321 of the first member 302. The circular flat portion 329 and the second member 303 fuse together as a result of the laser welding and then harden. The circular flat portion 329 has a thickness of 0.6 mm. The second member 303 has a sold cylindrical body. The rest of the arrangement is substantially identical with that of the third embodiment.

Comparative Example 2

Figure 15:
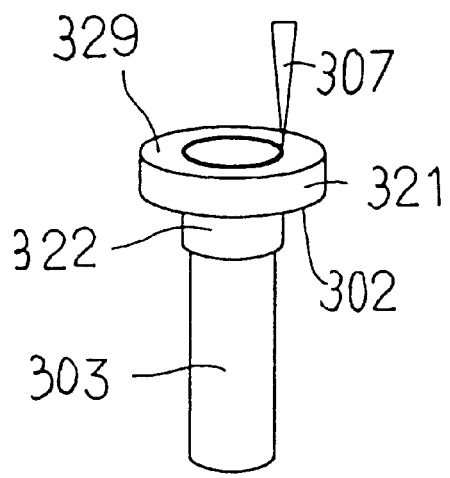
FIG. 15 is a perspective view showing a welding arrangement in accordance with another comparative example.
Figure 16:
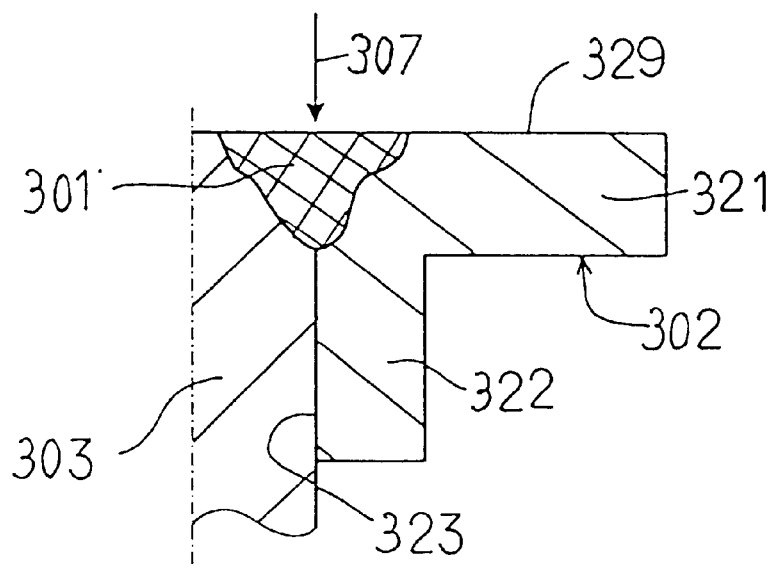
FIG. 16 is an enlarged cross-sectional view showing an essential part of the welding arrangement shown in FIG. 15.

FIGS. 15 and 16 show another comparative welding arrangement. The second member 303 extends across the through hole 323 of the first member 302. The upper end surface of the second member 303, exposed from the through hole 323, is flush with the ring flat portion 329 of the head portion 321. The irradiation of the laser beam 307 is applied along a circular boundary between the ring flat portion 329 of the head portion 321 and the second member 303. The rest of the arrangement is substantially identical with that of the third embodiment.

Experiment 1

Figure 17:
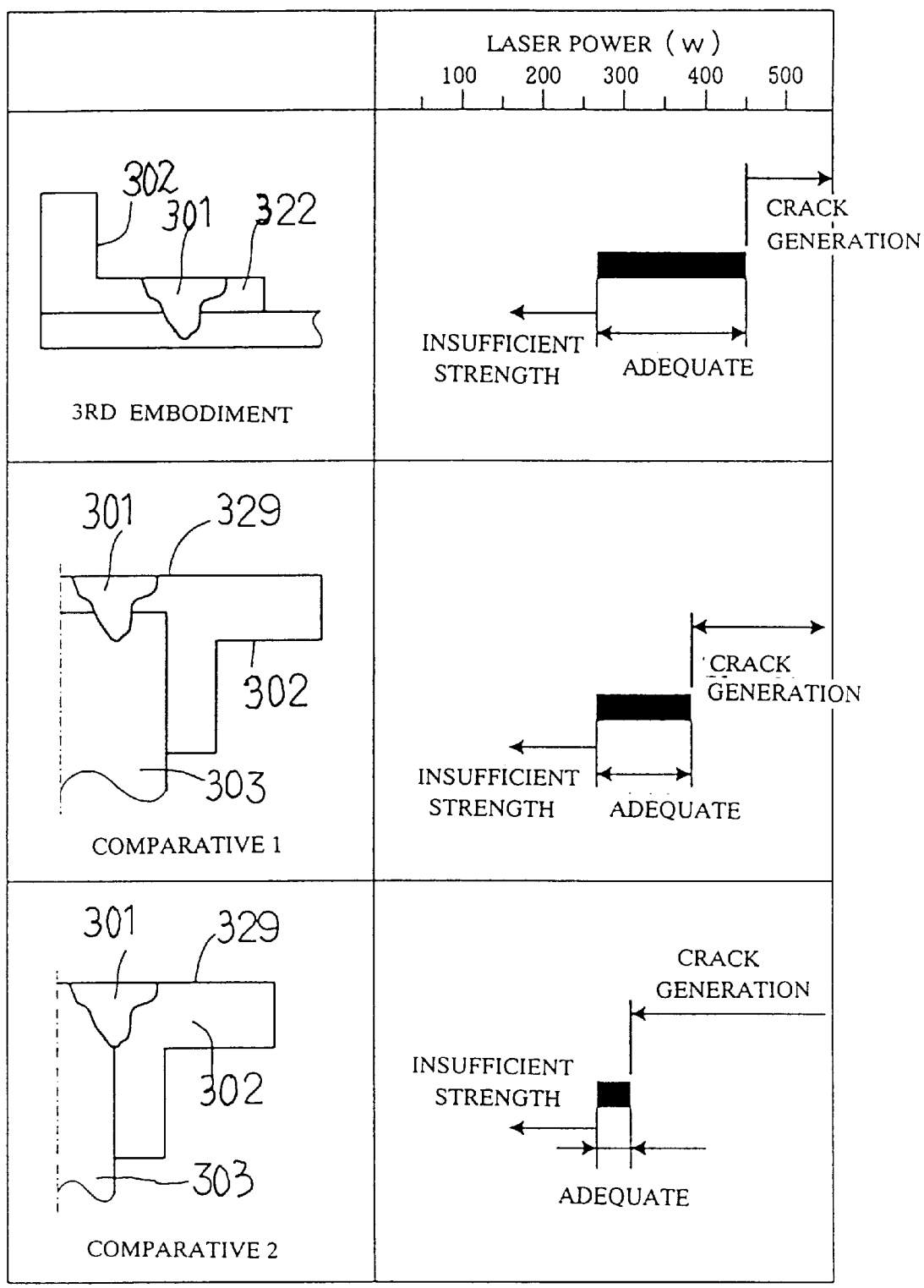
FIG. 17 is a view showing a relationship between the laser power and the condition of the fused portion in accordance with the third embodiment of the present invention.

FIG. 17 shows an experimental result conducted to evaluate the welding strength of the welding arrangement in each of the third embodiment, the comparative example 1 and the comparative example 2.

As apparent from FIG. 17, the third embodiment obtains a satisfactory fused portion 301 having a welding strength of 500 kgf and causing no crack when the laser power is in a wide range from 270 W to 450 W. The welding strength is not satisfactory when the laser power is less than 270 W, while there is a tendency that a crack is caused in the fused portion when the laser power exceeds 450 W.

On the other hand, the comparative examples 1 and 2 obtain satisfactory fused portions equivalent to that of the third embodiment when the laser power is in relatively narrow ranges of 270~375 W and 270~315 W, respectively.

It is believed that both the comparative examples 1 and 2 cause a crack due to a stress acting on the connecting portion or the influence of the compositions of the fused portion.

Experiment 2

Figure 18:
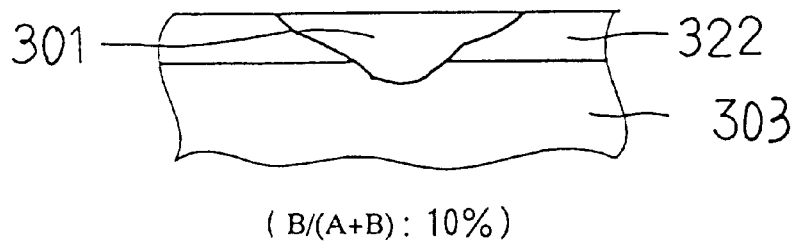
FIG. 18 is a cross-sectional view showing the fused portion formed when the dilution rate "S" is 10%.
Figure 19:
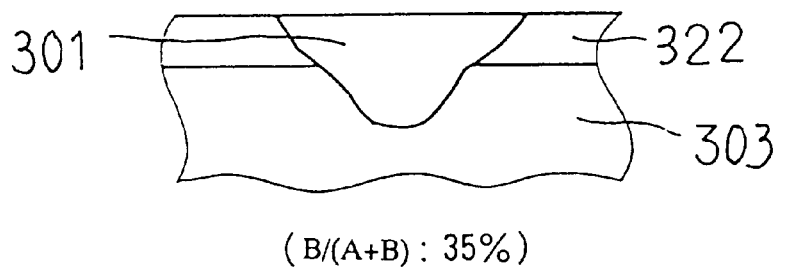
FIG. 19 is a cross-sectional view showing the fused portion formed when the dilution rate "S" is 35%.
Figure 20:
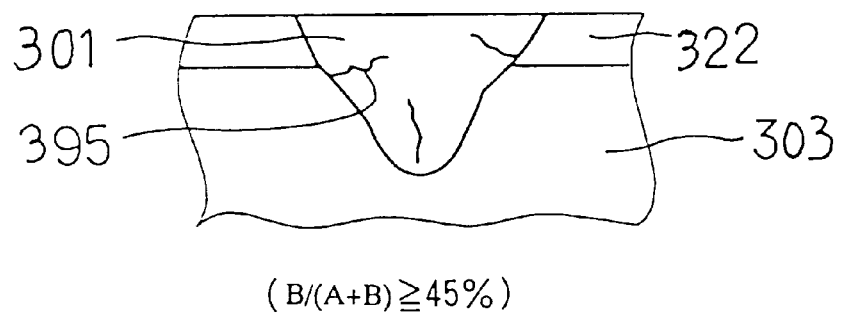
FIG. 20 is a cross-sectional view showing the fused portion formed when the dilution rate "S" is greater than 45%.

Another experiment was conducted to evaluate the relationship between the dilution rate "S" and the nature of the fused portion formed according to the third embodiment. FIG. 18 shows the fused portion 301 formed when the dilution rate "S" is 10%. In this case, the merging of the fused portion 301 into the second member 303 is unsatisfactory. The welding strength is therefore insufficient. FIG. 19 shows the fused portion 301 formed when the dilution rate "S" is 35%. In this case, the merging of the fused portion 301 into the second member 303 is satisfactory. The welding strength is therefore adequate. FIG. 20 A shows the fused portion 301 formed when the dilution rate "S" is greater than 45%. In this case, the merging of the fused portion 301 into the second member 303 is too much deep. This causes undesirable cracks 395 in the fused portion 301.

Experiment 3

Figure 21:
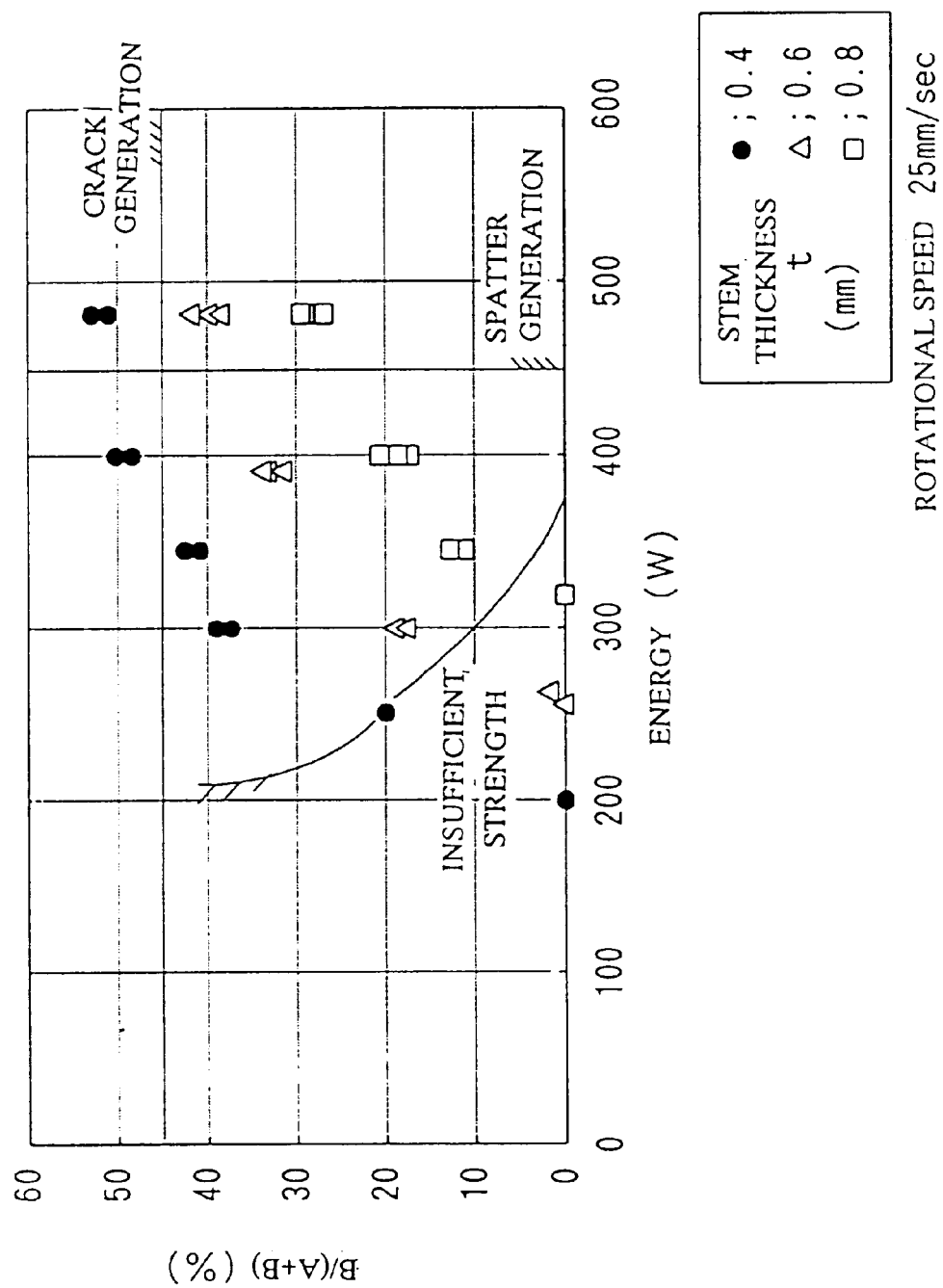
FIG. 21 is a characteristic view showing a relationship between the laser power and the dilution rate "S" of the fused portion in accordance with the third embodiment of the present invention.

FIG. 21 shows a relationship between the laser power and the dilution rate "S" of the fused portion 301, experimentally obtained from the welding arrangement of the third embodiment by varying the laser output as well as the thickness of the stem portion 322 when the stem portion 322 rotates at the speed of 25 mm/sec.

As apparent from FIG. 21, the third embodiment obtains a satisfactory fused portion in a wide range of the laser power without causing a crack or a spatter when the dilution rate "S" is in a range of 15~45%. Regarding the relationship between the stem thickness "t" and the dilution rate "S," the dilution rate exceeding 45% will cause a crack. When the limit of the welding strength is lower than 500 kgf, a satisfactory fused portion may be formed even when the dilution rate "S" is less than 15%.

Characteristic Features Of 3rd Embodiment

As apparent from the foregoing description, the above-described third of the present invention provides the welding method and the lap joint welding structure for connecting the first member (302) and the second member (303). The first member has the head portion (321), the stem portion (322), and the hole (323) extending in the head portion (321) and the stem portion (322). In a welding operation, the lap portion (310) is formed by inserting the second member (303) into the hole (323) of the first member (302) to form the lap portion (310). Then, the welding beam (307) is irradiated to the predetermined irradiation point on the outer surface of the stem member (322) of the lap portion (310). Then, the fused portion (301) is formed along a periphery of the lap portion (310) as a fused and hardened portion merging into the first member (302) and the second member (303).

Figure 9B:
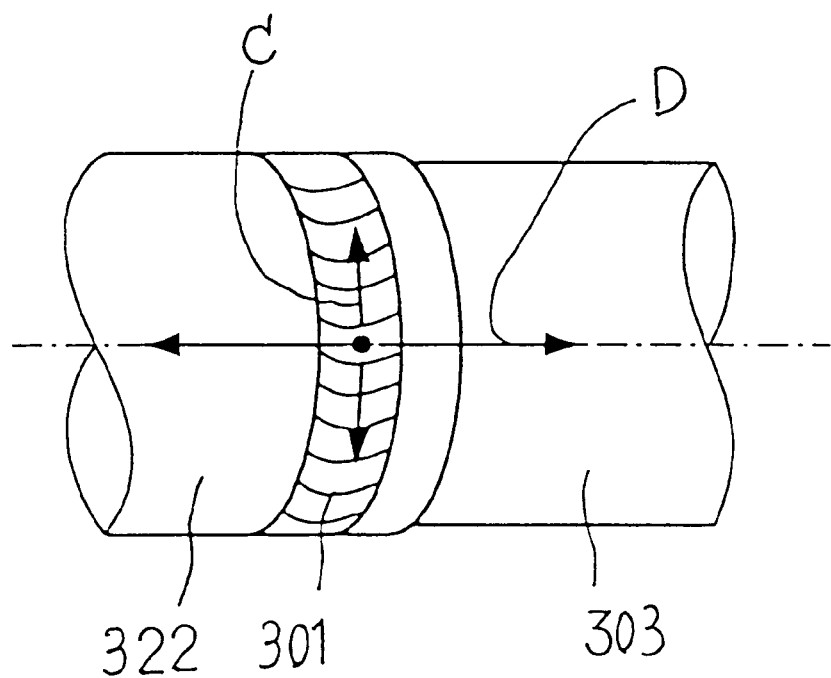
FIG. 9B is an enlarged perspective view showing the lap joint welding arrangement in accordance with the third embodiment of the present invention.

As shown in FIG. 9B, the fused portion 301 is subjected to a tensile stress acting in a circumferential direction "C" as well as in an axial direction "D." However, according to the welding structure realized by the above-described welding method, the tensile stress acting in the circumferential direction "C" can be absorbed by the stem portion (322) contracting in the radial direction. The contraction of the stem portion (322) causes a fastening force for firmly holding the pipe body of the second member (303) inserted in the hole (323) of the first member (302). In other words, the stem portion (322) and the second member (303) are tightly fasten at a contact surface other than the fused portion (301). Accordingly, the tensile stress acting in the axial direction "D" can be effectively absorbed by the portion other than the fused portion (301). This significantly prevents the fused portion (301) from being subjected to a concentrated stress.

Furthermore, according to the welding method of the third embodiment, the grain boundary of the formed metal crystals is strong. There is no deposition of impurity elements. Accordingly, the fused portion (301) is free from cracks. A wide range of laser power can be used to form the fused portion (301) in the above-described manner.

The first member (302) is made of the magnetic material comprising at least one selected from the group consisting of the silicon steel (Table 4), the Ni-group alloy steel (Table 1), and the ferrite stainless steel (Table 3).

The second member (303) is made of the anti-wear metallic material comprising at least one selected from the group consisting of the alloy tool steel (Table 5), the high speed tool steel (Table 6), and the martensite-group stainless steel (Table 2).

According to this arrangement, the resultant lap joint can be used as a magnetically controlled piece or part as the first member (302) is made of the magnetic material. Furthermore, the resultant lap joint has an excellent durability against wear and abrasion as the second member (303) is made of the anti-wear metallic material.

The dilution rate $S=B/(A+B)$ is in the range from 15 to 45%, where "A" represents a cross-sectional area of the fused portion (301) merging into the first member (302) and "B" represents a cross-sectional area of the fused portion (301) merging into the second member (303) as shown in FIG. 12.

When the dilution rate "S" is within the above-described range, the fused portion (301) merges into the first member (302) and the second member (303) with a sufficient depth. If the dilution rate "S" is less than 15%, the welding strength of the fused portion (301) will be insufficient. If the dilution rate "S" is greater than 45%, there will be a possibility that any crack may be caused in the fused portion (301).

The dilution rate "S" can be controlled by adjusting the power of the laser beam (307) or varying the thickness "t" of the stem portion (322).

When a required welding strength is 500 kgf, it is preferable that the thickness (t) of the stem portion (322) is in a range from 0.4 mm to 0.8 mm for obtaining a sufficient welding strength. If the thickness "t" is less than 0.4 mm, the stem portion (322) may be cause a crack due to mechanical weakness derived from its thin plate thickness. If the thickness "t" is greater than 0.8 mm, it will require an excessively high laser power that may cause a thermal distortion.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A lap joint welding structure comprising:
   a first member and a second member having end portions overlapped and fixed by welding at a predetermined lap portion;
   a fused edge portion formed at said lap portion as a fused and hardened portion merging into said first member and said second member; and
   a front end surface of said fused edge portion slanting at an obtuse angle larger than 90° with respect to a naked outer surface of said second member not overlapped with said first member.

2. The lap joint welding structure in accordance with claim 1, wherein said second member has a rod body inserted into a bore of said first member.

3. The lap joint welding structure in accordance with claim 2, wherein said first member has a rib brought into contact with said second member.

4. The lap joint welding structure in accordance claim 1, wherein said first member is a Ni-group alloy steel comprising the components (weight %) of C ($\leq 0.05$), Si ($\leq 0.30$), Mn ($\leq 1.25$), P ($\leq 0.04$), S ($\leq 0.03$), and Ni (40.00~50.00),
   said second member is a martensite-group stainless steel comprising the components (weight %) of C ($\leq 1.20$), Si ($\leq 1.00$), Mn ($\leq 1.25$), P ($\leq 0.04$), S ($\leq 0.03$), and Cr ($\leq 18.00$), and
   a dilution rate $S=B/(A+B)$ is equal to or less than 45%, where "A" represents a cross-sectional area of said fused edge portion merging into said first member and "B" represents a cross-sectional area of said fused edge portion merging into said second member.

5. The lap joint welding structure in accordance claim 1, wherein
   said first member is a ferrite-group stainless steel comprising the components (weight %) of C ($\leq 0.12$), Si ($\leq 3.00$), Mn ($\leq 1.25$), P ($\leq 0.04$), S ($\leq 0.03$), Cr ($\leq 20.00$), and Al ($\leq 5.00$),
   said second member is a martensite-group stainless steel comprising the components (weight %) of C ($\leq 1.20$), Si ($\leq 1.00$), Mn ($\leq 1.25$), P ($\leq 0.04$), S ($\leq 0.03$), and Cr ($\leq 18.00$), and
   a dilution rate $S=B/(A+B)$ is equal to or less than 30%, where "A" represents a cross-sectional area of said fused edge portion merging into said first member and "B" represents a cross-sectional area of said fused edge portion merging into said second member.

6. The lap joint welding structure in accordance with claim 1, wherein said fused edge portion is formed at said lap portion by irradiating a welding beam on an outer surface of said lap portion.

7. A welding method of forming a lap joint welding structure for connecting a first member and a second member, said welding method comprising the steps of:
   forming a lap portion by overlapping end portions of said first member and said second member;
   irradiating a welding beam to a predetermined irradiation point on an outer surface of said lap portion offset from an end surface of said lap portion;
   forming a fused edge portion along an outer periphery of said lap portion as a fused and hardened portion merging into said first member and said second member, and
   a front end surface of said fused edge portion slanting at an obtuse angle larger than 90° with respect to a naked outer surface of said second member not overlapped with said first member.

8. The lap joint welding method in accordance with claim 7, wherein a rod body of said second member is inserted into a bore of said first member for forming said lap portion.

9. The lap joint welding method in accordance with claim 8, wherein a distal end surface of said second member is brought into contact with a rib formed in said bore of said first member.

10. The lap joint welding method in accordance with claim 7, wherein the irradiation of said welding beam is performed along an entire periphery of the lap portion so that a front end surface of said fused edge portion slants at an obtuse angle larger than 90° with respect to a naked outer surface of said second member not overlapped with said first member.

11. A welding method of forming a lap joint welding structure for connecting a first member and a second member, said first member having a head portion, a stem portion, and a hole extending in said head portion and said stem portion, said welding method comprising the steps of:
    forming a lap portion by inserting said second member into said hole of said first member to form a lap portion;
    irradiating a welding beam to a predetermined irradiation point on an outer surface of said stem member of said lap portion; and
    forming a fused portion along a periphery of said lap portion as a fused and hardened portion merging into said first member and said second member.

12. The lap joint welding method in accordance with claim 11, wherein said first member is made of a magnetic material comprising at least one selected from the group consisting of a silicon steel, a Ni-group alloy steel, and a ferrite stainless steel.

13. The lap joint welding method in accordance with claim 11, wherein said second member is made of an anti-wear metallic material comprising at least one selected from the group consisting of an alloy tool steel, a high speed tool steel, and a martensite-group stainless steel.

14. The lap joint welding method in accordance with claim 11, wherein a dilution rate $S=B/(A+B)$ is in a range from 15 to 45%, where "A" represents a cross-sectional area of said fused portion merging into said first member and "B" represents a cross-sectional area of said fused portion merging into said second member.

15. A lap joint welding structure comprising:
    a first member having a head portion, a stem portion, and a hole extending in said head portion and said stem portion;
    a lap portion formed between said first member and a second member inserted into said hole of said first member; and
    a fused portion formed along a periphery of said lap portion as a fused and hardened portion merging into said first member and said second member.

16. The lap joint welding structure in accordance with claim 15, wherein said first member is made of a magnetic material comprising at least one selected from the group consisting of a silicon steel, a Ni-group alloy steel, and a ferrite stainless steel.

17. The lap joint welding structure in accordance with claim 15, wherein said second member is made of an anti-wear metallic material comprising at least one selected from the group consisting of an alloy tool steel, a high speed tool steel, and a martensite-group stainless steel, said alloy tool steel comprising the components (weight %) C ($\leqq 2.4$), Si ($\leqq 1.2$) Mn ($\leqq 0.6$), P ($\leqq 0.03$), S ($\leqq 0.03$), V ($\leqq 2.2$), Cr ($\leqq 15.0$), MO ($\leqq 3.0$) and Fe (Bal.), and said high speed tool steel comprising the components (weight %) C ($\leqq 1.6$), Si ($\leqq 0.5$), Mn ($\leqq 0.4$), P ($\leqq 0.03$), S ($\leqq 0.03$), Cr ($\leqq 4.5$), W ($\leqq 19.0$), V ($\leqq 5.2$) and Fe (Bal.).

18. The lap joint welding structure in accordance with claim 15, wherein a dilution rate S=B/(A+B) is in a range from 15 to 45%, where "A" represents a cross-sectional area of said fused portion merging into said first member and "B" represents a cross-sectional area of said fused portion merging into said second member.

* * * * *